United States Patent
Bartlett et al.

(10) Patent No.: US 7,280,303 B2
(45) Date of Patent: Oct. 9, 2007

(54) DATA STORAGE METHOD AND APPARATUS TO DETECT IF WORM DATA HAS BEEN TAMPERED WITH

(75) Inventors: Paul Frederick Bartlett, Bristol (GB); Rhys Wyn Evans, Caerdydd (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 310 days.

(21) Appl. No.: 11/082,614

(22) Filed: Mar. 17, 2005

(65) Prior Publication Data

US 2005/0207221 A1 Sep. 22, 2005

(30) Foreign Application Priority Data

Mar. 20, 2004 (GB) .................................. 0406309.5

(51) Int. Cl.
*G11B 21/02* (2006.01)
(52) U.S. Cl. .......................................... 360/75; 360/48
(58) Field of Classification Search ...................... None
See application file for complete search history.

(56) References Cited

U.S. PATENT DOCUMENTS

| 6,282,040 B1 * | 8/2001 | Bartlett ......................... 360/48 |
| 6,288,862 B1 * | 9/2001 | Baron et al. ................... 360/55 |
| 6,674,596 B1 | 1/2004 | Takayama |
| 6,883,122 B2 * | 4/2005 | Maple et al. .................. 714/54 |
| 2002/0024756 A1 | 2/2002 | Baron et al. |

FOREIGN PATENT DOCUMENTS

| EP | 0535920 A2 | 4/1993 |
| EP | 0936618 A2 | 8/1999 |
| EP | 0 942 427 A2 | 9/1999 |
| EP | 1302942 A2 | 4/2003 |
| EP | 1 508 900 A1 | 2/2005 |
| WO | WO 01/09895 A1 | 2/2001 |
| WO | WO 03/083866 A1 | 10/2003 |

OTHER PUBLICATIONS

ECMA-319 Data Interchange on 12, 7mm 384-Track Magnetic Tape Cartridges Ultrium-1 Format Jun. 2001, Section 13.5.
GB Search Report dated Jun. 9, 2004.

* cited by examiner

*Primary Examiner*—K. Wong

(57) ABSTRACT

A method is provided of detecting if WORM data has been tampered with, the data having been recorded in a sequence of data sets. Each data set includes a write pass value and the write pass values are incremented at intervals in the sequence according to a predetermined rule providing that the write pass values are incremented each time a predetermined number of the data sets has occurred in the sequence. The data sets are read in sequence and the write pass value of each data set is compared with the write pass value of the preceding data set. An indication is made if the write pass value of any of the data sets differs from the write pass value of the preceding data set by an amount that breaches the predetermined rule.

16 Claims, 5 Drawing Sheets

DATA STORAGE METHOD AND APPARATUS TO DETECT IF WORM DATA HAS BEEN TAMPERED WITH

TECHNICAL FIELD

This invention concerns methods and apparatus to detect if WORM data has been tampered with.

CLAIM TO PRIORITY

This application claims priority to copending United Kingdom utility application entitled, "DATA STORAGE METHOD AND APPARATUS TO DETECT IF WORM DATA HAS BEEN TAMPERED WITH," having serial no. GB0406309.5, filed Mar. 20, 2004, which is entirely incorporated herein by reference.

BACKGROUND

Tape cartridges in use today incorporate a magnetic tape having data tracks for recording a succession of units of information known as data sets. Each data set consists of a data region within which data is recorded and a data set information table that describes the content of the data region. Data to be recorded is sent to the cartridge by a tape drive and is recorded within the data regions. The data set information table for each data set has a multiplicity of fields each of which has a pre-allocated number of bytes of storage. The fields store records of information such as the data set number, the valid data length, the data set type, and the drive manufacturer identity. The data sets are also encoded with a tape write pass value. The write pass value is set to 1 when the tape is first written to. The write pass value is incremented at certain logical points during the writing of data sets along the tape including a point where a change is made in the physical forward or reverse direction of movement of the tape or at a point where an append operation begins and causes an existing data set to be overwritten.

Data written to the tape may be protected from being overwritten. Such data is protected by drive level processing that renders the tape as write-once-read many (WORM) protected. When trying to protect data written to tape in a WORM environment, safeguards are implemented to prevent the data from being overwritten, accidentally or intentionally. One of the main considerations with WORM protected data is to be able to detect whether the data has been tampered with by overriding the safeguards designed to protect the data.

One such safeguard to prevent overwriting of WORM protected data includes providing information in a cartridge memory to inform the drive that the cartridge is WORM protected. It may, however, be possible to tamper with the cartridge so that either information in the cartridge memory is altered or the cartridge memory is swapped for another such memory, thereby allowing the unauthorised overwriting of data that should be WORM protected.

EP 0 936 618, incorporated herein by reference, describes a method of encoding data on a data storage tape in a manner to distinguish between new data and incompletely erased old data. The data is arranged in track blocks each having a track block header including a write pass identifier field initially set to 1 on a first occasion that data is written. On each subsequent occasion that data is written to cause existing data to be overwritten, the write pass identifier field is incremented by 1. If the write pass identifier field of any particular block is found to be at a lower value than that of the preceding blocks, then that block is determined to be from old, incompletely overwritten data.

SUMMARY

According to the present invention, there is provided a method of detecting if WORM data has been tampered with, the data having been recorded in a sequence of data sets, each data set including a write pass value, and the write pass values having been incremented at intervals, the method comprising the steps of reading the data sets in sequence, comparing the write pass value of each data set with the write pass value of the preceding data set, and indicating if the write pass value of any of the data sets differs from the write pass value of the preceding data set by an amount that breaches a predetermined rule, the predetermined rule providing that the write pass values are incremented each time a predetermined number of the data sets has occurred in the sequence.

Further according to the present invention, there is provided data storage apparatus comprising a tape drive adapted to receive a tape cartridge having a data storage tape on which WORM data has been recorded in a sequence of data sets, each data set including a write pass value, and the write pass values having been incremented at intervals, the tape drive being programmed to read the data sets in sequence, to compare the write pass value of each data set with the write pass value of the preceding data set and to indicate if the write pass value of any of the data sets differs from the write pass value of the preceding data set by an amount that breaches a predetermined rule, the predetermined rule providing for an increment in the write pass value each time a predetermined number of the data sets has occurred in the sequence.

BRIEF DESCRIPTION OF THE DRAWINGS

The invention will now be described, by way of example only, with reference to the accompanying drawings in which.

DETAILED DESCRIPTION

Figure 1:
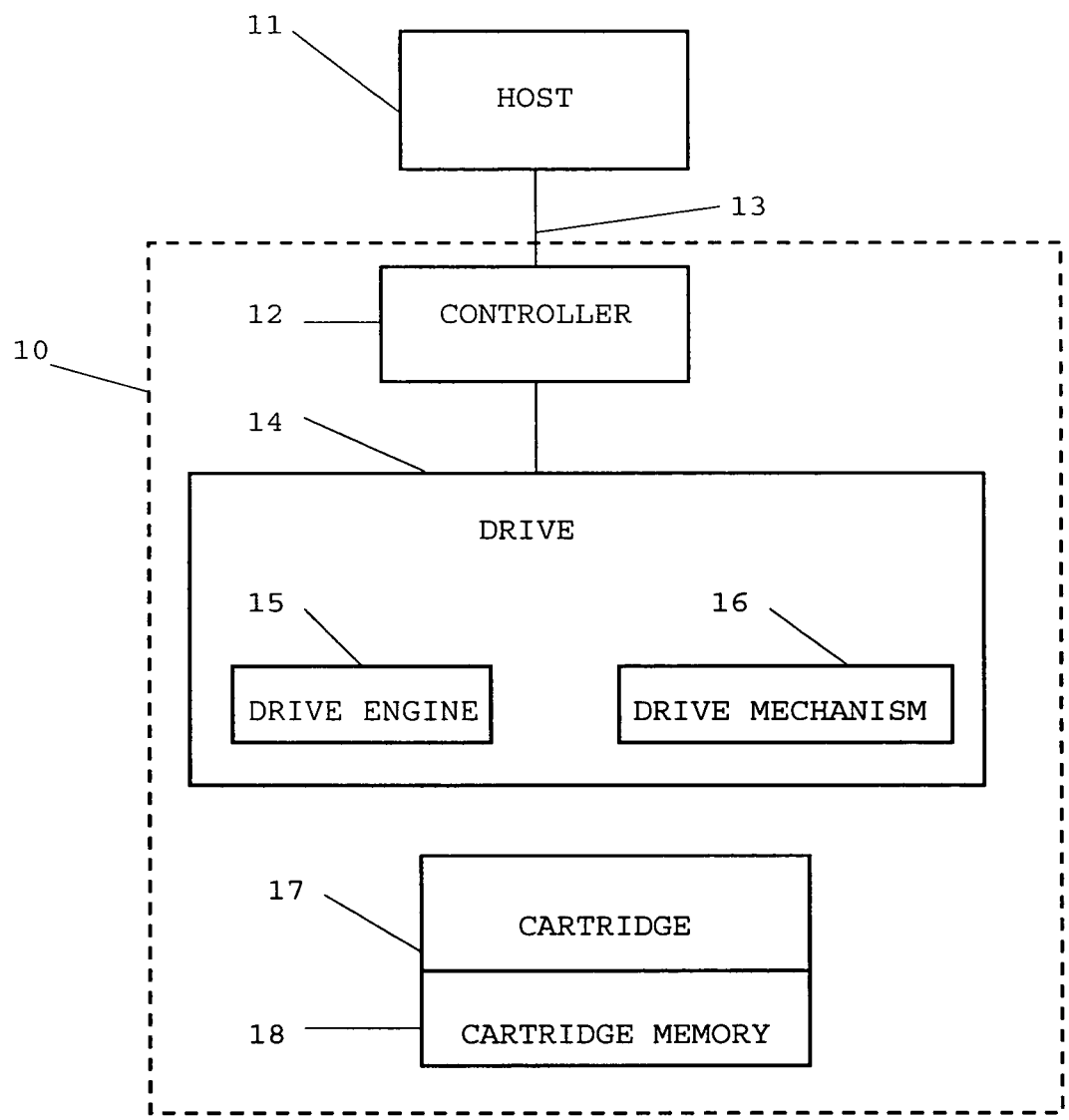
FIG. 1 is a block diagram of the hardware components and interconnections of a data storage system according to the present invention.

Referring to FIG. 1, there is shown a data storage apparatus 10 embodying the present invention coupled to at least one hierarchically superior host 11. The data storage apparatus includes a controller 12 connected to the host 11 by an interface 13. The data storage apparatus also includes a tape drive 14, including a drive engine 15 and drive mechanism 16, that receives a tape cartridge 17 that has a cartridge memory 18. A controlling software application on the host 11 controls the tape drive 14 to read data from and write data to the tape storage cartridge 17.

The host system 11 has at least one central processing unit (CPU) and a memory to store the controlling software application. The interface 13 connecting the host system 11 to the data storage apparatus 10 is preferably a Small Computer Systems Interface (SCSI) or a USB (Universal Serial Bus). The method of communication over either of these standard busses is known to those skilled in the art. Other suitable interfaces may be used by other embodiments.

The drive mechanism 16 includes electrical and mechanical components that receive, position and access tape cartridges. The drive mechanism 16 has components to lock a tape cartridge 17 in place, an ejection motor and read/write heads (not shown). The drive engine 15 is a data processor that is programmed to supervise the operation of the drive mechanism 16 and to manage the flow of data to be recorded in or read from a tape cartridge 17 received in the drive 14. Importantly, the drive engine 15 controls the process of recording and reading the data to provide protection of the data as will be explained in greater detail below.

Figure 2:
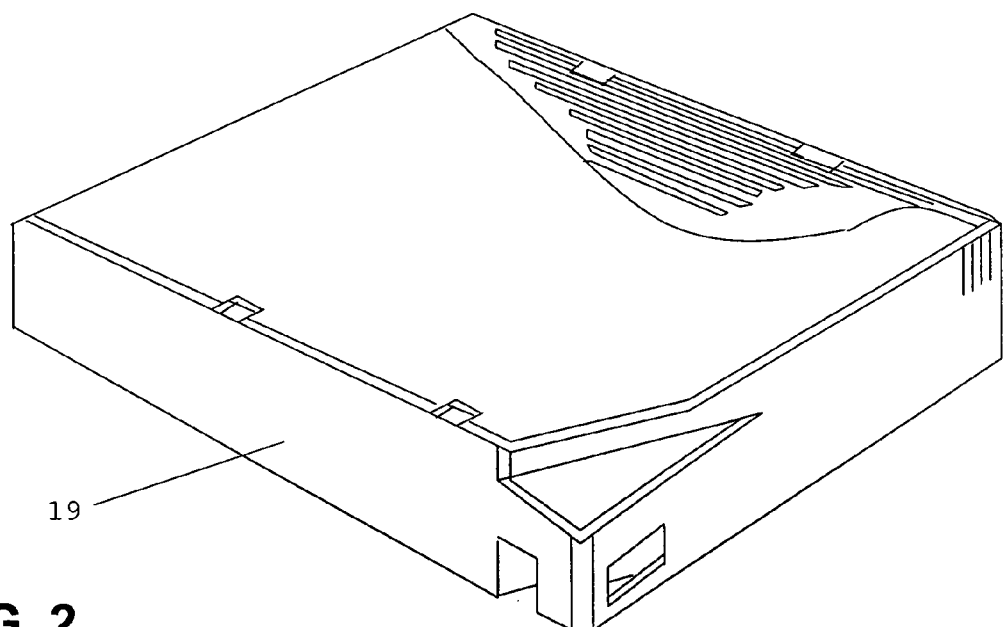
FIGS. 2 and 3 show a tape cartridge included in the system of FIG. 1.
Figure 3:
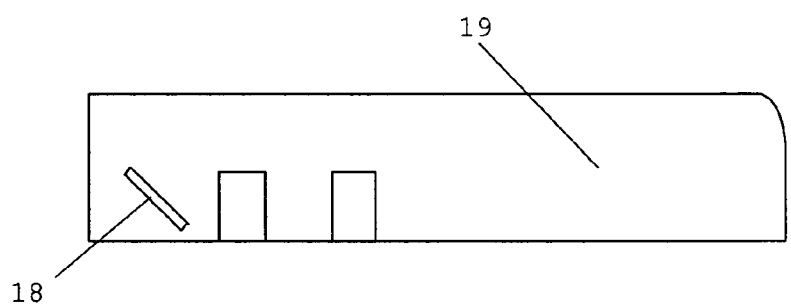

FIGS. 2 and 3, show a general view of the cartridge 17 including a structural casing 19 within which are located the cartridge memory 18 and a magnetically recordable tape (not shown). The cartridge 17 is an implementation of Linear Tape Open (LTO) technology. The tape is supported on a rotatable tape reel or spool and has a leader by means of which the tape drive 14 can uncoil and withdraw the tape from the cartridge 17 reel or spool for data reading or recording.

Figure 4:
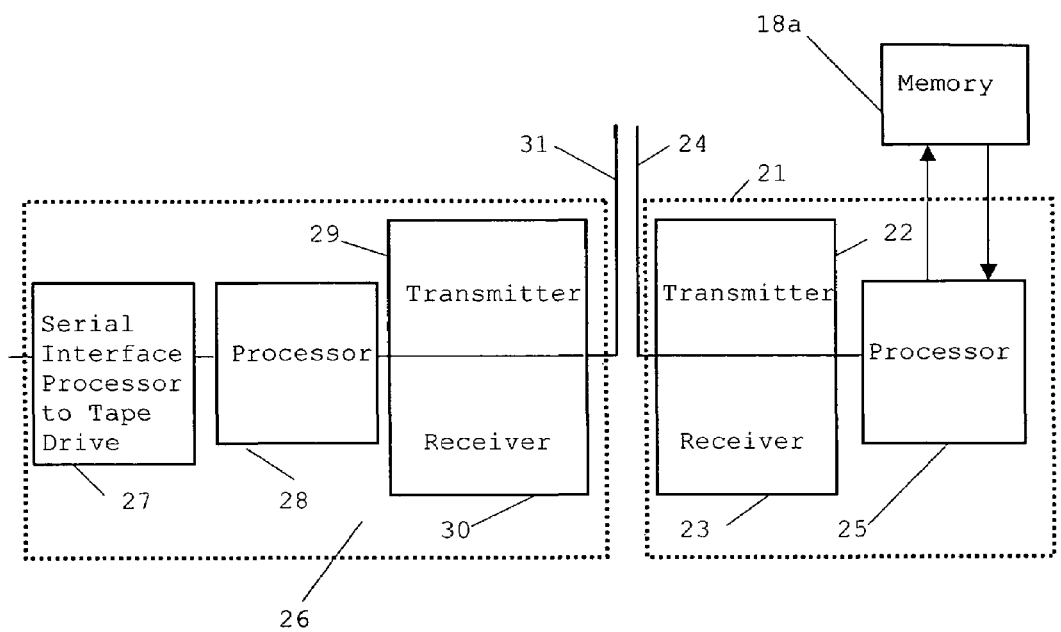
FIG. 4 is a block diagram of transponders and memory included in the data storage apparatus of FIG. 1, FIGS. 5, 6 and 7 are diagrams of data recording on a tape included in the tape cartridge of FIGS. 2 and 3.

Referring to FIG. 4, the cartridge memory 18 includes a transponder 21 and a memory area 18a that has the capability of non-volatile storage and is preferably an EEPROM (electronically erasable programmable read only device). The transponder 21 consists of a transmitter 22, a receiver 23, an aerial 24 and a processor 25. The cartridge memory 18 co-operates with a transmitter/receiver module 26 incorporated into the tape drive 14 (FIG. 1). The module 26 includes a serial interface 27 to the tape drive, a processor 28, a transmitter 29, a receiver 30 and an aerial 31. The transponder 21 incorporated into the cartridge 17 is inductively powered by the transmitter/receiver module 26 and data is exchanged between the transmitter/receiver 22, 23 of the transponder 21 and the transmitter/receiver 29, 30 of the module 26 by way of the inductively coupled aerials 24 and 31. The aerials 24 and 31 thus provide a contactless coupling of the cartridge memory 18 to the tape drive 14 for data transfer between the cartridge memory 18 and the tape drive 14 when the tape cartridge 17 has been received by the tape drive. In the case where the cartridge is to be WORM protected, the information provided by the cartridge memory 18 indicates that the cartridge is WORM protected and that WORM protected data written to the tape is not to be overwritten.

The cartridge memory area 18a stores information including usage information, cartridge manufacturer information and cartridge memory manufacturer information. The cartridge manufacturer information includes the cartridge type, a serial number of the cartridge and an identification of the manufacturer. The cartridge memory manufacturer information includes the serial number of the transponder, the type of transponder and the serial number of the cartridge memory.

Figure 5:
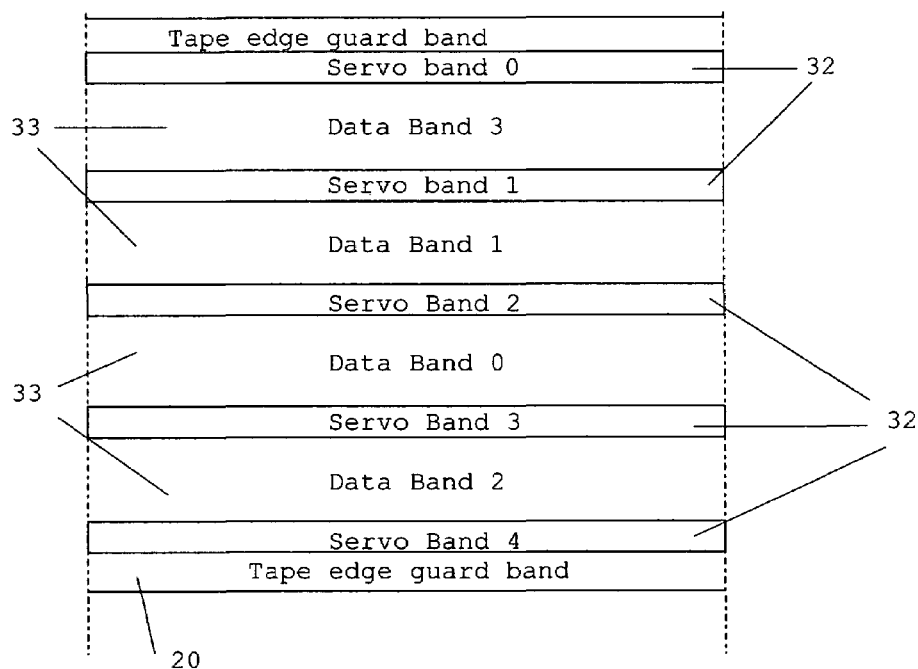
Figure 6:
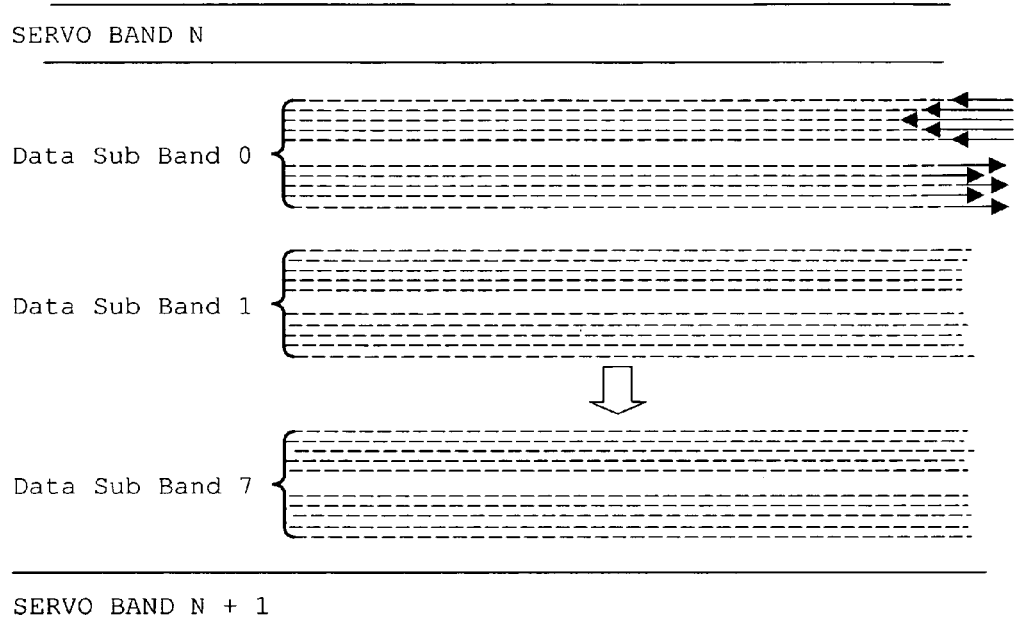

FIGS. 5 and 6 are diagrammatic representations of the manner in which data is recorded on the tape 20. Each of FIGS. 5 and 6 show a short portion only of the tape 20. There are five servo bands 32 pre-recorded on the tape 20 that are used for track following while the cartridge is being operated in the cartridge drive 14. The servo bands 32 are written before the cartridge 17 (FIGS. 1-2) is usable for data storage and are located at predefined specific distances from one edge of the tape that is referred to as the tape reference edge. Each servo band 32 contains servo frames encoded as longitudinal position words to provide an indication of the position down the length of the tape. In a preferred embodiment of the invention, the longitudinal position words each comprise 36 servo frames which increment in value as the tape is removed from the cartridge in the forward direction within a range from 0 to 7 529 535.

Each of the four areas between adjacent pairs of servo bands is a data band 33, the bands 33 being numbered 2, 0, 1 and 3, respectively, with data band 2 being nearest to the tape reference edge and data band 3 being furthest from the tape reference edge. The four data bands each have 128 data tracks arranged in eight data sub-bands as shown in FIG. 6. The 16 data tracks in a sub-band are accessed in a spiral manner in forward and reverse wraps. Forward wraps are recorded while the tape is moving from the beginning of the tape to the end of the tape and reverse wraps are recorded while the tape is moving from the end of the tape to the beginning of the tape.

Figure 7:
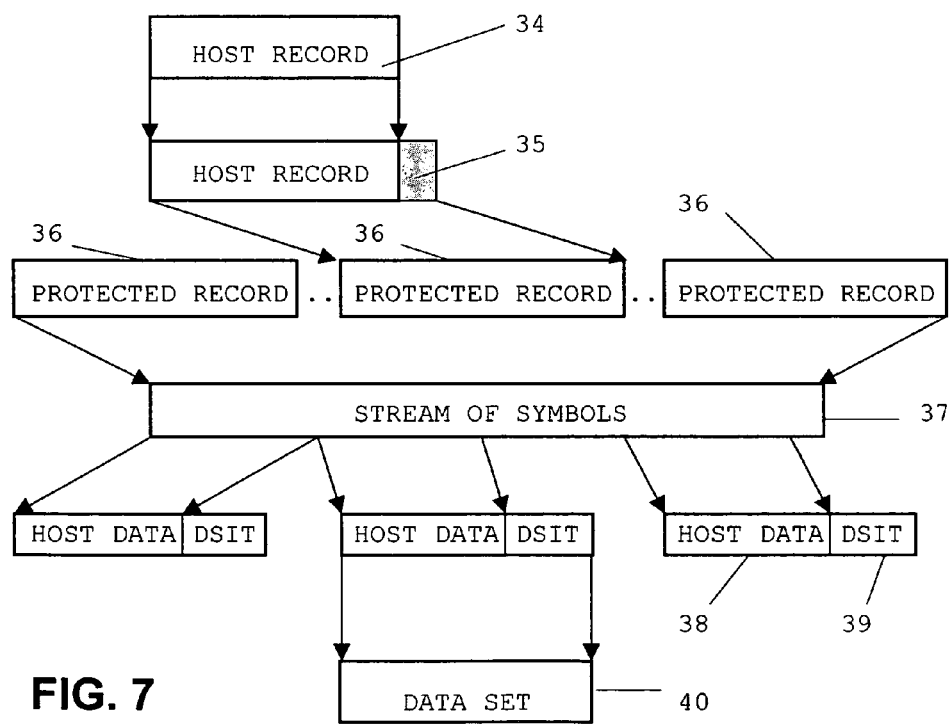

FIG. 7 shows the way in which data is transformed as it flows from the host 11 to the recorded tape 20. The data conforms to a data format in which data is logically divided into records 34 and file marks. Each record 34 is processed by the host to compute a cyclic redundancy check (CRC) character 35 that is added to the record to form a protected record 36. The CRC character is useful in the detection of errors. A data compression algorithm processes the protected records 36 and file marks to produce a stream of symbols 37 broken into sets of host data 38 to which a data set information table (DSIT) 39 is added. The host data and data set information table 39 together constitute a data set 40. The sequence of data sets ends with an end of data (EOD) data set. The data sets are protected by two orthogonal Reed-Solomon codes providing coding bytes that are added to the bytes of the data set.

The data set information table 39 for each data set 40 has a field in which a write pass value is entered for the data set. The write pass value is set to a value of 1 when the tape is first written to. The value is incremented throughout the data set sequence following a predetermined rule that the write pass value is incremented each time that the data set number is a multiple of 100. The increment is calculated as being equal to the previous write pass value incremented by one more than the number of records written to tape in the previous data set. The value also follows the predetermined rule that it is incremented by 1 when writing data from the beginning of each forward or reverse wrap. In addition, the rule requires the write pass value to be incremented when an append data operation begins that causes any existing data set, including an end of data (EOD) data set, to be overwritten. The write pass value is thus incremented in a predetermined manner at intervals in the sequence of data sets recorded on the tape 20. The cartridge memory 18 has a field for storing the write pass values.

Despite the provision of information by the cartridge memory 18 to the drive 14 indicating that the cartridge 17 is a WORM protected cartridge, it is possible that the cartridge could be tampered with so that the information in the cartridge memory 18 is altered thereby allowing the data written to the cartridge to be at least selectively overwritten. If however, data is fraudulently written, it will have an anomalous incremental write pass value. This is because the anomalous write pass value will not conform to the prescribed rule governing the manner in which the write pass values increase incrementally in the sequence of data sets.

The integrity of the WORM data written at any point along the tape is checked against tampering by reference to the write pass values as will now be described with reference to FIG. 8. Attempts to tamper with WORM data at just a single point or a few points on the tape will come to light.

Figure 8:
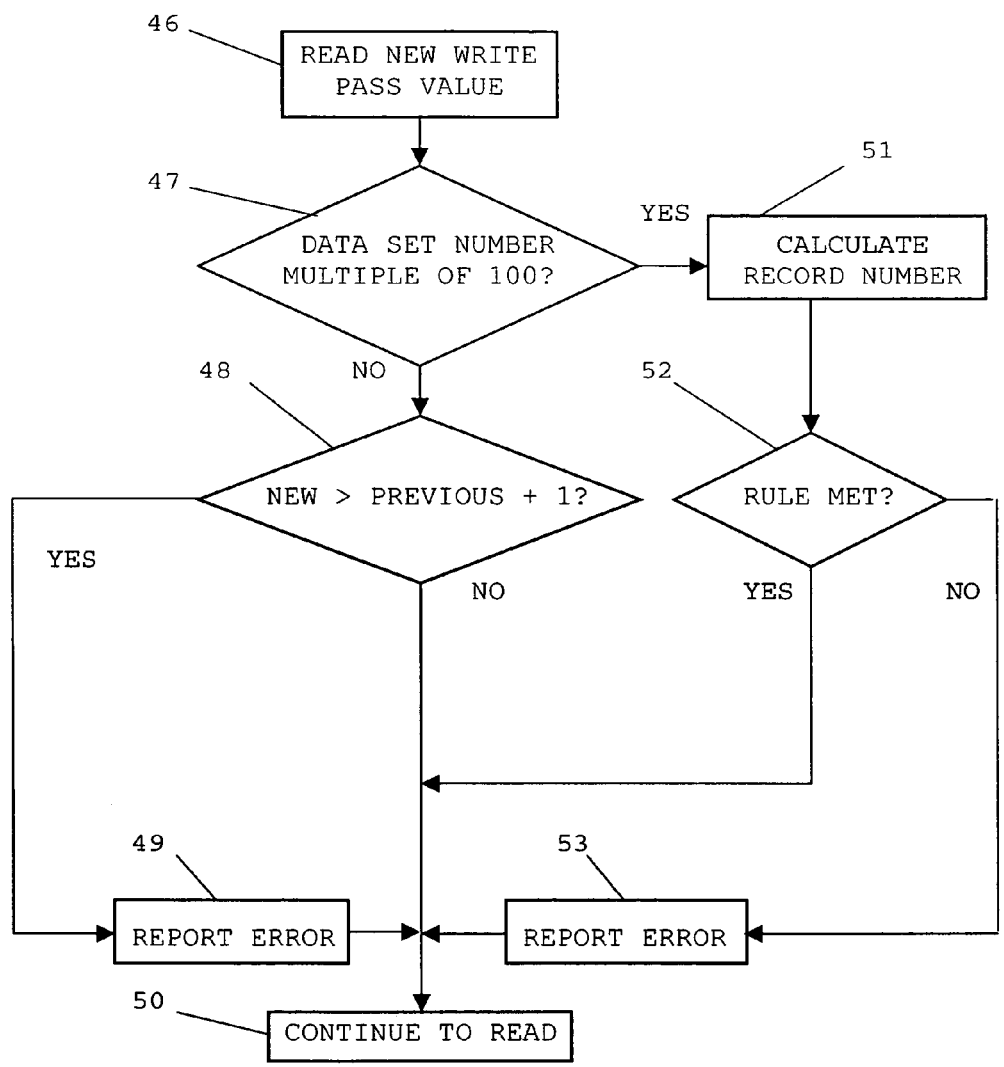
FIG. 8 is a flow diagram illustrating steps in a method embodying the present invention.

Referring to FIG. 8, in a first step 46, a new write pass value is read from a data set. In step 47, a determination is made whether the data set number is a multiple of 100. If not, the process moves to step 48 to check whether the new write pass value is greater than the previous write pass value by an increment exceeding 1. If so, the process moves to step 49 to report an error to the host before passing to step 50 where the next data set on the tape is read. If the determination in step 48 is negative, the process moves to step 50.

In the event that the determination in step 47 is that the data set number is a multiple of 100, the process moves to step 51 where a calculation is made of the number of records since the last data set. After this calculation, the process moves to step 52 where a check is made whether the new write pass value is equal to the previous write pass value incremented by 1 and added to the number of data records since the last data set. If so, the process moves to step 50 to continue reading the tape.

If it is determined that the check performed in step 52 is negative, the process moves to step 53 to report an error to the host before moving to step 50 to continue reading the tape.

The predetermined rule prescribing how the write pass values should increment is exemplary only. Other alternatives may be employed depending on the degree of complexity that can be tolerated in calculating the increments in the write pass values. Thus, the increments may be subject to an encoding process of more or less complexity to provide the desired level of security against tampering of the data.

What is claimed is:

1. A method of detecting if WORM data has been tampered with, the data having been recorded in a sequence of data sets, each of the data sets including a write pass value, and the write pass values having been incremented at intervals, the method comprising the steps of reading the data sets in sequence, comparing the write pass value of each data set with the write pass value of the preceding data set and indicating if the write pass value of any of the data sets differs from the write pass value of the preceding data set by an amount that breaches a predetermined rule, the predetermined rule providing that the write pass values are incremented each time a predetermined number of the data sets has occurred in the sequence.

2. A method as claimed in claim 1, in which the predetermined rule for the write pass values provides for an increment after a multiple of 100 data sets in the sequence.

3. A method as claimed in claim 1, in which the predetermined rule for the write pass values provides for an increment of one more than a number of records written to tape.

4. A method as claimed in claim 1, in which the data sets are recorded in a succession of tape wraps and the predetermined rule provides for the write pass value to increment at the commencement of each wrap of the tape.

5. A method as claimed in claim 4, in which the predetermined rule provides for the write pass value to increment by one at the commencement of each wrap of the tape.

6. A method as claimed in claim 1, in which the predetermined rule provides for the write pass value to increment when an append data operation begins that causes any existing data set to be overwritten.

7. A method as claimed in claim 1, in which the predetermined rule provides for the write pass value to increment by one when an append data operation begins that causes any existing data set to be overwritten.

8. A method as claimed in claim 1, in which the data sets each have a data set information table in which the write pass value for the data set is written.

9. Data storage apparatus comprising a tape drive adapted to receive a tape cartridge having a data storage tape on which WORM data has been recorded in a sequence of data sets, each data set including a write pass value, and the write pass values having been incremented at intervals, the tape drive being programmed to read the data sets in sequence, to compare the write pass value of each data set with the write pass value of the preceding data set and to indicate if the write pass value of any of the data sets differs from the write pass value of the preceding data set by an amount that breaches a predetermined rule, the predetermined rule providing for an increment in the write pass value each time a predetermined number of the data sets has occurred in the sequence.

10. Apparatus as claimed in claim 9, in which the predetermined rule for the write pass values provides for the increment after a multiple of 100 data sets in the sequence.

11. Apparatus as claimed in claim 9, in which the predetermined rule provides for the increment of one more than a number of records written to the tape.

12. Apparatus as claimed in claim 9, adapted to receive the tape cartridge in which the data sets are recorded in a succession of tape wraps of the data storage tape and the predetermined rule provides for the write pass value to increment at the commencement of each wrap of the tape.

13. Apparatus as claimed in claim 12, in which the predetermined rule provides for the write pass value to increment by one at the commencement of each wrap of the tape.

14. Apparatus as claimed in claim 9, in which the predetermined rule provides for the write pass value to increment where an append data operation has caused any existing data set to be overwritten.

15. Apparatus as claimed in claim 9, in which the predetermined rule provides for the write pass value to increment by one where an append data operation has caused any existing data set to be overwritten.

16. Apparatus as claimed in claim 9, adapted to receive the tape cartridge in which the data sets each have a data set information table in which the write pass value for the data set is written.

* * * * *